(12) United States Patent
Fidler et al.

(10) Patent No.: US 6,616,953 B2
(45) Date of Patent: Sep. 9, 2003

(54) CONCENTRATED SPENT FERMENTATION BEER OR SACCHAROPOLYSPORA ERYTHRAEA ACTIVATED BY AN ENZYME MIXTURE AS A NUTRITIONAL FEED SUPPLEMENT

(75) Inventors: Daniel J. Fidler, Gurnee, IL (US); Jay Sanford Lampel, Mundelein, IL (US); Daniel B. Weyant, Winthrop Habor, IL (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 10/036,908

(22) Filed: Dec. 21, 2001

(65) Prior Publication Data

US 2002/0146484 A1 Oct. 10, 2002

Related U.S. Application Data

(60) Provisional application No. 60/259,163, filed on Jan. 2, 2001.

(51) Int. Cl.⁷ ............................. A23K 1/14; A23K 1/18; A23K 1/165
(52) U.S. Cl. ................. 426/2; 426/31; 426/52; 426/53; 426/61; 426/807
(58) Field of Search ............... 426/2, 31, 52, 426/53, 61, 807

(56) References Cited

U.S. PATENT DOCUMENTS

| | | | | |
|---|---|---|---|---|
| 3,939,285 A | * | 2/1976 | Garrett, Sr. et al. | 426/285 |
| 4,073,884 A | * | 2/1978 | Hartdegen et al. | 424/94 |
| 5,124,258 A | * | 6/1992 | Arison et al. | 435/119 |
| 5,140,042 A | * | 8/1992 | Arison et al. | 514/450 |
| 5,989,600 A | * | 11/1999 | Nielsen et al. | 426/52 |
| 6,090,416 A | | 7/2000 | Iritani et al. | 426/53 |
| 6,143,543 A | | 11/2000 | Michelsen et al. | 435/196 |
| 6,153,251 A | | 11/2000 | Fukuhara et al. | 426/643 |
| 6,162,473 A | | 12/2000 | Fodge et al. | 426/53 |

FOREIGN PATENT DOCUMENTS

| | | | |
|---|---|---|---|
| EP | 0257996 | * | 3/1988 |
| EP | 0718399 | * | 6/1996 |
| FR | 2287508 | * | 6/1976 |
| GB | 745488 | * | 2/1956 |
| GB | 851601 | * | 10/1960 |

* cited by examiner

Primary Examiner—Chhaya D. Sayala
(74) Attorney, Agent, or Firm—Johanna M. Corbin

(57) ABSTRACT

A feed additive composition which contains enzyme-treated, concentrated spent fermentation beer of *Saccharopolyspora erythraea*; a method for making a feed additive containing enzyme-treated concentrated spent fermentation beer of *Saccharopolyspora erythraea*; a process for improving the nutritive value of spent fermentation beer of *Saccharopolyspora erythraea* by enzymatic treatment; a method for feeding livestock with a feed containing an enzyme-treated, concentrated spent fermentation beer of *Saccharopolyspora erythraea* additive and a process for improving poultry feed conversion, breast meat yield and intestinal strength by feeding a feed containing an enzyme-treated, concentrated spent fermentation beer of *Saccharopolyspora erythraea* additive are disclosed. Preferably, the spent fermentation beer of *Saccharopolyspora erythraea* is treated with a cellulase and at least one glycosidase, and then concentrated.

44 Claims, No Drawings

CONCENTRATED SPENT FERMENTATION BEER OR SACCHAROPOLYSPORA ERYTHRAEA ACTIVATED BY AN ENZYME MIXTURE AS A NUTRITIONAL FEED SUPPLEMENT

This application claims priority to the provisional application Serial No. 60/259,163 filed on Jan. 2, 2001.

FIELD OF THE INVENTION

The present invention is directed to a feed additive composition which contains enzyme-treated, concentrated spent fermentation beer of *Saccharopolyspora erythraea*; a method for making a feed additive containing enzyme-treated, concentrated spent fermentation beer of *Saccharopolyspora erythraea*; a process for improving the nutritive value of the spent fermentation beer of *Saccharopolyspora erythraea* by enzymatic treatment; a method for feeding livestock with a feed containing an enzyme-treated, concentrated spent fermentation beer of *Saccharopolyspora erythraea* feed additive and a process for improving poultry feed conversion, breast meat yield and intestinal strength by feeding a feed containing an enzyme-treated, concentrated spent fermentation beer of *Saccharopolyspora erythraea* feed additive. Preferably, the spent fermentation beer of *Saccharopolyspora erythraea* is treated with a cellulase and at least one glycosidase, and then concentrated.

BACKGROUND OF THE INVENTION

The world population continues to grow, but land for food production is finite. In order to keep up with the growing food demand, improvements in the utilization of food resources will be needed to maintain the current living standards.

In many areas of the world, diets containing low metabolizable energy content are utilized. Diets in these countries are not supplemented with fat. As a consequence, there is a need to increase the energy efficiency for utilization of low fat diets. In developing or developed countries supplemental concentrated fat is being eliminated from the diet for health reasons. In addition, there are a surprising number of problems associated with the addition of concentrated fat to diet rations to increase the metabolizable energy (ME) content of the feed.

Oxidation of unsaturated fatty acids in fat is know to lead to the formation of peroxides and free radicals. This in turn leads to the oxidation of feed nutrients and vitamins. There is also evidence available that indicates that high fat diets can lead to ventricular failure and/or ascites problems in broiler chickens. Some sources of animal feed fat include restaurant waste fat that has been partially hydrogenated to create un-natural fatty acids with trans double bonds that can interfere with fertility, fatty acid metabolism and the energy value of the feed. Another issue is that the presence of free fatty acids in commercial and fats that can have adverse effect on production and may have a anti-microbial effect in the chicken gut. Blended fats are also frequently contaminated with polychlorinated biphenyls (PCB's), pesticide residues, heavy metals, and gossypol from cotton seed oil soapstock. Feed mill managers have to vigilant about all these issues. It is well known that ingested fat (and materials dissolved in it like PCB) can be directly incorporated into the fat of the animal that consumes it and this may present important health risks. In addition, the fat in animal rations can influence the taste of the meat. For example, more than 1% fish oil in chicken diets will cause a distinct fish-type odor in the meat or eggs. The effect of high fat content (especially animal fat) on product taste is another issue that some producers are beginning to pay close attention to. The ability to avoid the use of fat and still obtain the same productivity is therefore of general interest.

There is a continuing need for higher efficiency in food production and the urgency of providing solutions will only increase with time. The use of high energy diets which include several percent of fat to promote efficient animal growth is not always possible or desirable due to the high cost of fat or vegetable oils, or limited amounts of available animal fat in some of the most highly populated parts of the world (for example in China and India). There is a basic inefficiency in using the available fat in feed. For example, in the chemical and soap industries the fat could have more value. Finally, there are a number of health issues and problems associated with the incorporation of exogenous concentrated fats in animal diets. These issues are a further indication that a reduced fat, reduced calorie, animal feed diet that maintains high feeding efficiency is urgently needed.

A need therefore exists for a method to increase the efficiency with which monogastric animals utilize feed rations that contain a low metabolizeable energy content. Likewise, a need exists for a feed diet that can be utilized efficiently by monogastic animals without addition of fat.

One approach to improved efficiency has been to enhance the digestion of feeds by the inclusion of enzymes. Enzymatically aided digestion not only yields more meat per pound of feed, but also reduces the volume of manure and the disposal cost.

Some enzymes have been clearly recognized in the marketplace for their value as additives in animal feeds: xylanse, β-glucanase, enzymes that cleave phosphorus from phytic acid, hemicellulates (as disclosed in U.S. Pat. No. 6,162,473), ferulic acid esterase (as disclosed in U.S. Pat. No. 6,143,543) and mannanase. In addition to enzyme feed additives, small molecules such as aminocarboxylic acid derivatives as disclosed in U.S. Pat. No. 6,166,086 are also useful, and marine mammals treated with proteolytic enzymes have also been disclosed (U.S. Pat. No. 6,153,251). Fermentation products are also known as feed additives, such as a fermented formula feed obtainable from mixing a soybean feed material with wheat as disclosed in U.S. Pat. No. 6,090,416; and liquid Saccharopolyspora solubles. However, there is still a need for inexpensive and more efficient additives.

BRIEF SUMMARY OF THE INVENTION

The invention is directed to a feed additive composition comprising: an enzyme-treated, concentrated spent fermentation beer of *Saccharopolyspora erythraea*; said spent fermentation beer of *Saccharopolyspora erythraea* treated with a cellulase and at least one glycosidase prior to concentration. Preferably, the beer is treated with at least a first glycosidase and a second glycosidase, where the first glycosidase may be a pectinolytic enzyme, and the second glycosidase may be an arabinosidase. The cellulase may be β-glucanase. The pectinolytic enzyme may be polygalactouronase; and the arabinosidase may be α-N-arabinofurinosidase. Preferably, the beer is treated with less than 1 weight percent of each enzyme per total volume of said spent fermentation beer of *Saccharopolyspora erythraea*. The composition may have from about 40 to about 60 percent solids; a pH of from about 4 to about 5, the solids having average particle size of from about 2.5 to about 4 microns.

Preferably the composition has from about 45 to about 50 percent solids; a pH of from about 4.3 to about 4.5, the solids having an average particle size of from about 3.1 to about 3.5 microns.

The invention is also directed to a method for making a feed additive comprising the steps of:

a) treating a spent fermentation beer of *Saccharopolyspora erythraea* with acid at a temperature of from about 80° C. to about 100° C. to form a heat-treated spent fermentation beer;

b) cooling said heat-treated spent fermentation beer to a temperature of from about 40° C. to about 60° C.;

c) treating said spent fermentation beer resulting from step b) with an enzyme mixture for two to twenty hours at a pH of from about 3 to about 6 to form an activated spent fermentation beer;
wherein said enzyme mixture includes a cellulase and at least one glycosidase;

d) concentrating said activated spent fermentation beer to at least 31 percent solids; and then, e) recovering an enzyme-treated, concentrated spent fermentation beer of *Saccharopolyspora erythraea* feed additive product.

The invention is also directed to a process for improving nutritive value of spent fermentation beer of *Saccharopolyspora erythraea* as a feed additive by enzyme treatment comprising the steps of:

a) treating a spent fermentation beer of *Saccharopolyspora erythraea* with acid at a temperature of from about 80° C. to about 100° C. to form a heat-treated spent fermentation beer;

b) cooling said spent fermentation beer to a temperature of from about 40° C. to about 60° C.;

c) treating said spent fermentation beer resulting from step b) with an enzyme mixture for two to twenty hours at a pH of from about 3 to about 6 to form an activated spent fermentation beer;
wherein said enzyme mixture includes a cellulase and at least one glycosidase;

d) concentrating said activated spent fermentation beer to at least 31 percent solids; and then, e) recovering an improved enzyme-treated, concentrated spent fermentation beer of *Saccharopolyspora erythraea* feed additive product.

In this process, the enzyme-treated, concentrated spent fermentation beer of *Saccharopolyspora erythraea* product provides improved feed conversion.

The invention is also directed to a method for feeding livestock comprising the step of feeding livestock with a feed containing the feed additive described above. Preferably, the feed additive has an inclusion rate of from about 0.1 to about 10 weight percent per total weight of feed. Livestock includes poultry, swine, fish, crustaceans and cattle.

The invention is also directed to a process for improving feed conversion, breast meat yield and intestinal strength in poultry comprising adding the feed additive described above to poultry feed. Preferably, the feed additive is from about 0.1 to about 10 weight percent per total weight of feed.

DETAILED DESCRIPTION OF THE INVENTION

The present invention is directed to a feed additive composition which contains enzyme-treated, concentrated spent fermentation beer of *Saccharopolyspora erythraea*; a method for making a feed additive containing enzyme-treated, concentrated spent fermentation beer of *Saccharopolyspora erythraea*; a process for improving the nutritive value of spent fermentation beer of *Saccharopolyspora erythraea* by enzymatic treatment; a method for feeding livestock with a feed containing an enzyme-treated, concentrated spent fermentation beer of *Saccharopolyspora erythraea* feed additive and a process for improving poultry feed conversion, breast meat yield and intestinal strength by feeding a feed containing an enzyme-treated, concentrated spent fermentation beer of *Saccharopolyspora erythraea* feed additive. Preferably, the spent fermentation beer of *Saccharopolyspora erythraea* is treated with a cellulase and at least one glycosidase, and then concentrated.

The Compositions

Liquid Saccharopolyspora solubles (LSS) is a by-product from the manufacture of the antibiotic erythromycin, available from Abbott Laboratories. The antibiotic is produced by a fermentation process involving Saccharopolyspora species of bacteria. The fermentation medium for bacterial growth is largely soy-based and serves as a carbon source. When fermentation is complete, antibiotic is removed from the fermentation medium. After post-fermentation removal of antibiotic, the remaining material is referred to as a spent fermentation beer. This spent fermentation beer is then concentrated to approximately 30% solids, and the resulting product (called LSS) has been utilized as an additive in the feed industry for many years. LSS was traditionally called liquid streptomyces solids, but due to a recent nomenclature change, is now referred to as liquid Saccharopolyspora solids.

LSS is typically incorporated into feed as an additive in an amount of approximately 14–15 lb per ton of total feed in poultry or swine diets.

In the present invention, the spent beer from a fermentation of Saccharopolyspora is modified by treating it with enzymes, and allowing enzymatic digestion to occur over a period of hours. While some enzymes are known as feed additives, and LSS is known as a feed additive, there is no teaching of modifying a spent fermentation beer of *Saccharopolyspora erythraea* with enzymatic treatment to improve the spent fermentation beer's usefulness as a feed additive.

The enzymes utilized can each be added individually to the spent fermentation beer of *Saccharopolyspora erythraea*, or they can be premixed and added together at once. Order and methods of addition are not critical. Many different enzymes are useful, though we have found at least two enzymes to be essential: a cellulase and at least one glycosidase.

The cellulase may be β-glucanase.

The enzyme mixture may contain one or more glycosidases. Preferably, the enzyme mixture contains at least a first glycosidase and a second glycosidase.

The first glycosidase may be a pectinolytic enzyme. A pectinolytic enzyme is one which hydrolyzes and depolymerizes pectin. A presently preferred pectinolytic enzyme is polygalactouronase (PG), also referred to as pectin depolymerase or pectinase.

The second glycosidase may be an arabinosidase. Arabinosidases are hydrolases which cleave L-arabinose from oligo- or polysaccharides which contain α-linked L-arabinofuranosyl residues at the non-reducing ends.

Glycosidase and cellulase activity is necessary in the enzyme treatment utilized in the present invention. Each type of enzyme activity may be derived from a single enzyme, a combination of enzymes, or an enzyme complex.

The amount of enzyme which is required to modify the spent fermentation beer of Saccharopolyspora erythraea is low, under 1%, and preferably under 0.01% of a 100 L spent fermentation beer of Saccharopolyspora erythraea solution.

Other enzymes which may also be included in the mixture as useful for treating spent fermentation beer of Saccharopolyspora erythraea include acidic fungal proteases, xylanases, galactomannanses and hemicellusases, among others.

Other additives, such as anti-oxidants, probiotics, flavoring agents, enzymes, anti-fungal agents, preservatives, yeast or pellet binders may also be added to the feed additive composition described above. For example, propionic acid (in an amount of less than 15%) may be added to the composition.

The feed additive of the present invention is a viscous liquid, which is sprayed into a feed mixer to produce a feed. The additive of the present invention can be mixed into the feed in an amount of from about 0.1% to about 10% of the total feed. After mixing, the feed is pelleted. Feed pelleted to various sizes, depending upon the age of the animal to be fed, is then given to the animal.

Of course, the present invention is not limited to the particular embodiments and modes of operation described herein and it is possible to imagine a number of variations in the details without departing from the scope of this invention.

The examples below are presented to describe preferred embodiments and utilities of the invention and are not meant to limit the invention unless otherwise stated in the claims appended hereto.

EXAMPLE 1

The feed additive was prepared in the following manner. A spent fermentation beer from a fermentation of Saccharopolyspora erythraea, having about 6.5% to 7.5% solids was treated with $H_2SO_4$ at 95° C. to remove any antibiotics present. Then the antibiotic free spent beer was cooled to a temperature of 45° C. to 50° C. After cooling, a mixture of enzymes was added, and enzyme digestion of the spent beer occurred for twelve to sixteen hours at a pH of 3.5–5.0. This enzymatic treatment of the spent beer is used to reduce viscosity and to retard gel formation in the final product additive. The enzymes utilized are indicated in Table 1.

TABLE 1

Two Component Enzyme Mixture Used to Treat Spent Beer

| Tradename | Source | type | description | amount (weight/volume) |
|---|---|---|---|---|
| MULTIFECT B | Genencor, Int'l. of Rochester, NY | β-glucanase (a cellulase) | hydrolysis of glucans | 0.0090 % |
| DP474 | Valley Research Inc. of South Bend, IN | pectinase and arabinosidase (two glycosidases) | hydrolysis and depolymerization of pectin | 0.0090 % |

To illustrate the amount of each enzyme utilized, when a 33,000 L batch of spent beer is utilized, less than 3 kg of each enzyme would be added.

After the enzymes have been added and allowed to activate the spent beer for a number of hours, the resultant material is concentrated to 45–50% solids by removing water through an evaporative process in a Mechanical Vapor Recompression unit. After concentration, 0.5% propionic acid is added to make the final product feed additive.

The final product has the following characteristics.

An analysis indicated that the product contained 49% dry matter, has 15% crude protein, 8% of crude fat, 1% of crude fiber and 8% ash. Key amino acids found in the additive included 0.2% methionine, 0.4% lysine 0.1% tryptophan 0.5% threonine and 0.1% cystine. The key minerals found in the additive included 0.2% calcium, 0.2% phosphorus, 0.7% potassium, 0.2% magnesium and 2% sodium, along with a very high level of inositol.

A comparison of the characteristics of the additive of the present invention verses untreated liquid Saccharopolyspora solubles (LSS) are shown in Table 2.

TABLE 2

| characteristic | liquid Saccharopolyspora solubles | enzyme-treated, concentrated spent fermentation beer from a fermentation of Saccharopolyspora erythraea |
|---|---|---|
| percent solids | 28–30.5 | 45–50 |
| viscosity (cps) at 30° C. | 13,500 | 17,500 |
| pH | 4.1–4.5 | 4.3–4.5 |
| Bulk density (lb/gal) | 9.1 | 9.7 |
| Average Particle Size (μ) | 33 | 3.4 |

EXAMPLE 2

Using the procedure described in Example 1, another feed additive was made from a spent fermentation beer from a fermentation of Saccharopolyspora erythraea, substituting the five component enzyme mixture described in Table 3 below for the two enzyme mixture described in Table 1 above.

TABLE 3

Five Component Enzyme Mixture Used to Treat Spent Beer

| Tradename | Source | type | description | amount (weight/vol) |
|---|---|---|---|---|
| MULTIFECT B | Genencor International of Rochester, NY | β-glucanase | hydrolysis of β-glucans | 0.0090% |
| MULTIFECT GC | Genencor International of Rochester, NY | cellulase complex | hydrolysis of non-starch, non-pectin polysaccharides such as cellulose, glucans and xylans | 0.0090% |
| VISCOZYME | Novo Nordisk of Franklinton, NC | carbohydrase complex | activities include arabinase, hemicellulase, pectinase and xylanase | 0.0090% |
| DP474 | Valley Research, Inc. of South Bend, IN | pectinase and arabinosidase | hydrolysis and depolymerization of pectin | 0.0090% |
| DP420 | Valley Research, Inc. of South Bend, IN | cellulase complex | hydrolysis of β-D,1,4-glucosidic bonds of cellulase, its oligomers and derivatives | 0.0090% |

EXAMPLE 3

To illustrate the effectiveness of the additive of Example 1 at a variety of dosage rates to a basal feed, the following test was performed.

The chickens utilized in the test were Avian×Hubbard HyY commercial broilers obtained from Hoover's Hatchery, in Rudd, Iowa. Feed and water were provided as needed.

The weight of birds after 28 days on a basal diet was compared to the weight of birds after 28 days on a basal diet containing 0.5%, 1%, 2% or 4% of the additive of Example 1, and the results are presented in Table 4. The basal diet included 54.06% corn, 30.75 % soybean meal, 5% meat and bone, 3.55% fat, 0.95% phosphorus, 0.45% limestone, 0.29% salt, 0.27% DL-methionine, 0.08% lysine, 0.5% of a vitamin pre-mix and 0.1% of a trace mineral pre-mix. The results of Table 4 show that a heavier bird was obtained at each dosage level of additive in the basal diet over the basal diet alone.

Feed conversion was calculated by measuring the total feed consumption of a set number of birds in a pen, and dividing that number by the total weight of birds surviving 28 days and the weight of birds which died or were removed from the pen within the 28 day period to obtain adjusted feed conversion. Feed treated with the additive of the present invention at any of the measured dosage levels resulted in a lower adjusted feed conversion than when feed was untreated. A lower number for adjusted feed conversion indicates a more efficient feed. As a difference of 0.01 in adjusted feed conversion may translate to a million dollars in additional value of poultry produced, the results obtained for the additives of the present invention are highly significant, and indicate a greatly improved feed conversion.

TABLE 4

| Feed | Average Bird Weight (g) | Adjusted Feed Conversion |
|---|---|---|
| basal diet | 967 | 1.717 |
| basal diet and 0.5% Example 1 | 998 | 1.630 |
| basal diet and 1% Example 1 | 1012 | 1.656 |
| basal diet and 2% Example 1 | 1005 | 1.688 |
| basal diet and 4% Example 1 | 1013 | 1.688 |

EXAMPLE 4

To determine the advantages of adding the additive of the present invention to poultry feeds, the following tests were performed.

The chickens used for testing were Cobb×Cobb broilers obtained from Cobb Vantress, Inc of Cleveland, Ga. Feed and water were provided as needed.

The weight of birds after 49 days on a basal diet was compared to the weight of birds after 49 days on a basal diet containing either 0.5% of the additive of Example 1, or on a basal diet containing 1.0% of the additive of Example 1, and the results are presented in Table 5. The basal diet was similar to that used in Example 3. Table 5 demonstrates that at the lowest concentration tested, feed containing the additive gives a heavier bird.

TABLE 5

| Feed | Ave. weight (kg) |
| --- | --- |
| basal diet | 2.996 |
| basal diet and 0.5% Example 1 | 3.088 |
| basal diet and 1.0% Example 1 | 2.995 |

The amount of breast meat obtained from birds processed after being on a basal diet (described above), a basal diet containing 0.5% of the additive of Example 1, or a basal diet containing 1.0% of the additive of Example 1 for 50 days was measured, and compared to the total weight of the bird to determine what percent of the bird is breast meat. The results are presented in Table 6. The results indicate an increased percentage of breast meat at either concentration of additive over the basal feed.

TABLE 6

| Feed | Percent Breast Meat |
| --- | --- |
| basal diet | 22.6 |
| basal diet and 0.5% Example 1 | 23.1 |
| basal diet and 1.0% Example 1 | 23.4 |

To determine further advantages of the use of the additive in poultry feed, an intestinal strength study was performed. Intestinal strength is important in poultry processing, as a higher intestinal strength value indicates a stronger intestine which means that the contents of the gut will be less likely to rupture and contaminate the meat during mechanized processing of birds.

The intestinal strength of birds processed after being on a basal diet, a basal diet containing 0.5% of the additive of Example 1, or a basal diet containing 1.0% of the additive of Example 1 for 48 days was measured using a motorized, semi-automatic strength testing machine, and the results are presented in Table 7. The results indicate a higher intestinal strength in birds fed feeds containing the additive of Example 1.

TABLE 7

| Feed | Average Intestinal Strength (kg) |
| --- | --- |
| basal diet | 0.397 |
| basal diet and 0.5% Example 1 | 0.421 |
| basal diet and 1.0% Example 1 | 0.432 |

EXAMPLE 5

To determine the increase in nutritive content provided by the feed additive of the present invention, Apparent Metabolizable Energy (AME) was measured, according to the following procedure.

Ninety six day-old male broiler chicks of a commercial strain were allocated to two diets; a basal diet or a basal diet including 4.8% of the additive described in Example 1. The basal diet included 58.44% corn, 34.97% soybean meal, 2% animal-vegetable fat, 1.56% dicalcium phosphate, 1.4% limestone, 1.00% vitamin-mineral pre-mix of microminerals and vitamins, 0.36% salt, DL-methionine and 0.07% L-lysine.

Feed and water were provided as needed. Birds were fed only the basal diet to six days of age. After six days of age (day 6) they were provided either only the basal diet, or the basal diet including the additive. After day 9 excreta were collected for three consecutive days and feed intake was recorded at the end of the excreta collection period. Excreta were dried in an oven at 65° C. for 72 hours and then gross energy and nitrogen content of the diets and excreta were analyzed. AME is calculated according to the procedure described by Leeson et al. in *Commercial Poultry Nutrition*, University Books, Ontario, Canada, pp. 12–52 and in *Nutritional Requirements of Poultry*, National Academy Press, Washington, D.C., 1994, pp. 3–8. The AME calculated for the basal diet was 2859.2 kcal/kg, while the AME for the basal diet including the additive of the present invention was 2959.5 kcal/kg. Since an increase of 50 kcal is considered to be significant, this result indicates the present additives have a higher nutritive content than untreated liquid streptomyces solids.

All references cited are hereby incorporated by reference.

The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims:

We claim:

1. A feed additive composition comprising:
   an enzyme-treated, concentrated spent fermentation beer of *Saccharopolyspora erythraea*;
   said spent fermentation beer of *Saccharopolyspora erythraea* treated with a cellulase and at least one glycosidase prior to concentration.

2. The composition of claim 1 enzyme-treated with at least a first glycosidase and a second glycosidase.

3. The composition of claim 2 wherein said first glycosidase is a pectinolytic enzyme and said second glycosidase is an arabinosidase.

4. The composition of claim 3 wherein said pectinolytic enzyme is polygalacturonase and said cellulase is β-glucanase.

5. The composition of claim 3 wherein said arabinosidase is α-N-arabinofuranosidase.

6. The composition of claim 2 wherein less than 1 weight percent of each enzyme is used to treat the total volume of said spent fermentation beer of *Saccharopolyspora erythraea*.

7. The composition of claim 1 having from about 40 to about 60 percent solids; and a pH of from about 4 to about 5, said solids having average particle size of from about 2.5 to about 4 microns.

8. The composition of claim 1 having from about 45 to about 50 percent solids; and a pH of from about 4.3 to about 4.5, said solids having an average particle size of from about 3.1 to about 3.5 microns.

9. A method for making a feed additive comprising the steps of:
   a) treating a spent fermentation beer of *Saccharopolyspora erythraea* with acid at a temperature of from about 80° C. to about 100° C. to form a heat-treated spent fermentation beer;
   b) cooling said heat-treated spent fermentation beer to a temperature of from about 40° C. to about 60° C.;
   c) treating said spent fermentation beer resulting from step b) with an enzyme mixture for two to twenty hours at a pH of from about 3 to about 6 to form an activated spent fermentation beer;
      wherein said enzyme mixture includes a cellulase and at least one glycosidase;
   d) concentrating said activated spent fermentation beer to at least 31 percent solids; and then,
   e) recovering an enzyme-treated, concentrated spent fermentation beer of *Saccharopolyspora erythraea* feed additive product.

10. The method of claim 9 wherein said spent fermentation beer resulting from step b) is enzyme-treated with at least a first glycosidase and a second glycosidase.

11. The method of claim 10 wherein said first glycosidase is a pectinolytic enzyme and said second glycosidase is an arabinosidase.

12. The method of claim 11 wherein said pectinolytic enzyme is polygalactouronase and said cellulase is β-glucanase.

13. The method of claim 11 wherein said arabinosidase is α-N-arabinofuranosidase.

14. The method of claim 10 wherein less than 1 weight percent of each enzyme is used to treat the total volume of said spent fermentation beer of *Saccharopolyspora erythraea*.

15. The method of claim 9 wherein said product has from about 40 to about 60 percent solids; and a pH of from about 4 to about 5, said solids having average particle size of from about 2.5 to about 4 microns.

16. The method of claim 9 wherein said product has from about 45 to about 50 percent solids; and a pH of from about 4.3 to about 4.5, said solids having an average particle size of from about 3.1 to about 3.5 microns.

17. A process for improving nutritive value of the spent fermentation beer of *Saccharopolyspora erythraea* as a feed additive comprising the steps of:
   a) treating a spent fermentation beer of *Saccharopolyspora erythraea* with acid at a temperature of from about 80° C. to about 100° C. to form a heat-treated spent fermentation beer;
   b) cooling said heat-treated spent fermentation beer to a temperature of from about 40° C. to about 60° C.;
   c) treating said spent fermentation beer resulting from step b) with an enzyme mixture for two to twenty hours at a pH of from about 3 to about 6 to form an activated spent fermentation beer;
      wherein said enzyme mixture includes a cellulase and at least one glycosidase;
   d) concentrating said activated spent fermentation beer to at least 31 percent solids; and then,
   e) recovering an improved enzyme-treated, concentrated spent fermentation beer of *Saccharopolyspora erythraea* feed additive product.

18. The process of claim 17 wherein said enzyme-treated, concentrated spent fermentation beer of *Saccharopolyspora erythraea* feed additive product provides improved feed conversion.

19. The process of claim 17 wherein said antibiotic free spent fermentation beer resulting from step b) is enzyme-treated with at least a first glycosidase and a second glycosidase.

20. The process of claim 19 wherein said first glycosidase is a pectinolytic enzyme and said second glycosidase is an arabinosidase.

21. The process of claim 20 wherein said pectinolytic enzyme is polygalactouronase and said cellulase is β-glucanase.

22. The process of claim 20 wherein said arabinosidase is α-N-arabinofuranosidase.

23. The process of claim 20 wherein less than 1 weight percent of each enzyme is used to treat the total volume of said spent fermentation beer of *Saccharopolyspora erythraea*.

24. The process of claim 17 wherein said feed additive product has from about 40 to about 60 percent solids; and a pH of from about 4 to about 5, said solids having average particle size of from about 2.5 to about 4 microns.

25. The process of claim 17 wherein said feed additive product has from about 45 to about 50 percent solids; and a pH of from about 4.3 to about 4.5, said solids having an average particle size of from about 3.1 to about 3.5 microns.

26. A method for feeding livestock comprising the step of feeding livestock with a feed containing the feed additive composition of claim 1.

27. The method of claim 26 wherein said feed additive is from about 0.1 to about 10 weight percent per total weight of said feed.

28. The method of claim 26 wherein said livestock are selected from the group consisting of poultry, swine, fish, crustaceans and cattle.

29. The method of claim 26 wherein said spent fermentation beer is enzyme-treated with at least a first glycosidase and a second glycosidase.

30. The method of claim 29 wherein said first glycosidase is a pectinolytic enzyme and said second glycosidase is an arabinosidase.

31. The method of claim 30 wherein said pectinolytic enzyme is polygalactouronase and said cellulase is β-glucanase.

32. The method of claim 30 wherein said arabinosidase is α-N-arabinofuranosidase.

33. The method of claim 29 wherein less than 1 weight percent of each enzyme is used to treat the total volume of said spent fermentation beer of *Saccharopolyspora erythraea*.

34. The method of claim 26 wherein said feed additive has from about 40 to about 60 percent solids; and a pH of from about 4 to about 5, said solids having average particle size of from about 2.5 to about 4 microns.

35. The method of claim 26 wherein said feed additive has from about 45 to about 50 percent solids; and a pH of from about 4.3 to about 4.5, said solids having an average particle size of from about 3.1 to about 3.5 microns.

36. A process for improving feed conversion, breast meat yield and intestinal strength in poultry comprising adding the feed additive composition of claim 1 to poultry feed.

37. The process of claim 36 wherein said feed additive is from about 0.1 to about 10 weight percent per total weight of said feed.

38. The method of claim 36 wherein said spent fermentation beer is enzyme-treated with at least a first glycosidase and a second glycosidase.

39. The method of claim 38 wherein said first glycosidase is a pectinolytic enzyme and said second glycosidase is an arabinosidase.

40. The method of claim 39 wherein said pectinolytic enzyme is polygalactouronase and said cellulase is β-glucanase.

41. The method of claim 39 wherein said arabinosidase is α-N-arabinofuranosidase.

42. The method of claim 38 wherein less than 1 weight percent of each enzyme is used to treat the total volume of said spent fermentation beer of *Saccharopolyspora erythraea*.

43. The method of claim 37 wherein said feed additive has from about 40 to about 60 percent solids; and a pH of from about 4 to about 5, said solids having average particle size of from about 2.5 to about 4 microns.

44. The method of claim 37 wherein said feed additive has from about 45 to about 50 percent solids; and a pH of from about 4.3 to about 4.5, said solids having an average particle size of from about 3.1 to about 3.5 microns.

* * * * *